(12) United States Patent
Lundström

(10) Patent No.: US 7,798,262 B2
(45) Date of Patent: Sep. 21, 2010

(54) ELECTRICALLY PROPULSED VEHICLE

(75) Inventor: Lennart Lundström, Sidensjö (SE)

(73) Assignee: El-Forest AB, Arnasvall (SE)

( * ) Notice: Subject to any disclaimer, the term of this patent is extended or adjusted under 35 U.S.C. 154(b) by 937 days.

(21) Appl. No.: 10/579,243

(22) PCT Filed: Nov. 12, 2007

(86) PCT No.: PCT/SE2004/001662

§ 371 (c)(1),
(2), (4) Date: Jul. 10, 2006

(87) PCT Pub. No.: WO2005/047042

PCT Pub. Date: May 26, 2005

(65) Prior Publication Data

US 2007/0089916 A1 Apr. 26, 2007

(30) Foreign Application Priority Data

Nov. 14, 2003 (SE) .................................. 0303007

(51) Int. Cl.
*B62D 59/04* (2006.01)
(52) U.S. Cl. ................. 180/14.1; 180/418; 180/6.5; 180/24.01; 180/65.51
(58) Field of Classification Search ............. 180/14.1, 180/16, 6.48, 24.01, 24.03, 24.06–24.08, 180/6.5, 418–420, 6.24, 6.26–6.3, 65.51
See application file for complete search history.

(56) References Cited

U.S. PATENT DOCUMENTS

| 3,734,538 A | * | 5/1973 | Humes | 280/426 |
| 3,865,208 A | * | 2/1975 | Crawshay et al. | 180/6.48 |
| 4,484,758 A | * | 11/1984 | Murray et al. | 280/442 |
| 4,506,747 A | | 3/1985 | Wykhuis | |
| 4,549,610 A | * | 10/1985 | van der Lely | 172/3 |
| 4,709,771 A | * | 12/1987 | Basham et al. | 180/6.5 |
| 4,732,053 A | * | 3/1988 | Gleasman et al. | 74/665 L |

(Continued)

FOREIGN PATENT DOCUMENTS

DE 0034598 1/2002

(Continued)

OTHER PUBLICATIONS

Patent Abstracts of Japan, vol. 2002, No. 05, May 3, 2002 & JP 20020104505 A (TCM Corp), Jan. 11, 2002 abstract.

*Primary Examiner*—Lesley Morris
*Assistant Examiner*—Tashiana Adams
(74) *Attorney, Agent, or Firm*—Young & Thompson

(57) ABSTRACT

A vehicle has at least three drive axles each with a pair of drive wheels, a steering system that directly controls the steering angle between at least two of the drive axles. The vehicle is arranged so that all drive wheels on its right hand side and left hand side, respectively, essentially follow the same wheel tracks when it is driven. The frequency of rotation is individually controllable for each drive wheel. The vehicle includes differential compensating elements arranged to register the relative steering angle for each consecutive pair of drive axles, respectively, and the mutual frequency of rotation for the drive wheels of each drive axle is controlled by the registered relative steering angle associated with the axle. A drive axle arrangement for such a vehicle is also disclosed.

18 Claims, 11 Drawing Sheets

U.S. PATENT DOCUMENTS

| | | | | |
|---|---|---|---|---|
| 5,139,103 A * | 8/1992 | Ducote | | 180/24.01 |
| 5,244,072 A * | 9/1993 | Etherington et al. | | 198/303 |
| 5,301,787 A * | 4/1994 | Etherington et al. | | 198/303 |
| 5,392,872 A * | 2/1995 | Ducote | | 180/24.01 |
| 5,636,699 A * | 6/1997 | Pitman, I | | 175/203 |
| 5,924,512 A * | 7/1999 | Wada | | 180/253 |
| 6,016,885 A * | 1/2000 | Hickman et al. | | 180/418 |
| 6,402,170 B1 * | 6/2002 | Hurlburt | | 280/103 |
| 6,923,453 B2 * | 8/2005 | Pivac | | 280/6.154 |
| 6,953,408 B2 * | 10/2005 | Thompson | | 475/5 |
| 7,044,244 B2 * | 5/2006 | Irikura | | 180/6.26 |
| 7,108,086 B2 * | 9/2006 | Hurlburt | | 180/22 |
| 7,112,155 B2 * | 9/2006 | Keuth | | 475/6 |
| 2002/0108793 A1 * | 8/2002 | Timoney et al. | | 180/24.08 |

FOREIGN PATENT DOCUMENTS

| | | |
|---|---|---|
| DE | 0225038 | 12/2003 |
| EP | 0417326 | 3/1991 |
| FR | 2745760 | 9/1997 |
| FR | 2745764 | 9/1997 |
| GB | 887459 | 1/1962 |
| NZ | 242929 | 7/1994 |
| NZ | 284129 | 12/1997 |
| WO | 01/28796 A1 | 4/2001 |

* cited by examiner

ELECTRICALLY PROPULSED VEHICLE

The present invention relates to a vehicle with two or more drive axles, and specifically a vehicle so arranged that all wheels on the right and left hand side, respectively, always follow the same wheel track during driving.

BACKGROUND OF THE INVENTION

Commercially available articulated vehicles, such as forest vehicles and loading machines, are often equipped with conventional mechanical and/or hydraulic power trains. In such vehicles the force from an engine is transmitted to the drive wheels through an arrangement of shafts, hydraulics and gears. Such arrangements are often very complicated, heavy and expensive to manufacture, they further require extensive maintenance. Moreover a differential gear has to be arranged between each pair of drive wheels to make it possible for the vehicle to turn. However, in order to achieve acceptable availability, e.g. in difficult terrain, the power train has to be equipped with a differential lock/break arrangement that counteracts the differential gear, e.g. if one of the drive wheels loose traction. Such lock/break arrangements make the mechanical power train even more complicated, at the same time as the maneuverability is vastly deteriorated when they are activated. Moreover the complex power train gives rise to considerable power losses, that in turn gives rise to higher fuel consumption.

The drawbacks of mechanical power trains are especially obvious for vehicles with more than two pair of drive wheels, such as forest vehicles with three or more pairs of drive wheels. Tests have been performed to replace the mechanical power train with an essentially fully hydraulic power train where each drive wheel is driven by an individual hydraulic drive motor. However, these trials have shown that power trains require a very complicated control system in order to achieve the differential function from a conventional mechanical power train, as the system may encounter a pressure drop if one wheel looses traction (looses the contact with the ground).

Different types of electrically propulsed vehicles have been proposed during the years, but for different reasons only a few have been commercially successful. Electrical propulsion is something that so far almost exclusively has been related to small vehicles up to the size of an automobile. U.S. Pat. No. 3,171,505 discloses an automobile with individual electrical propulsion of the drive wheels of the automobile.

JP 2002-010405 discloses an electrical power train for an articulated loading machine, truck or the like, wherein each wheel is driven by an individual electrical motor and the frequency of rotation for each wheel during a turning operation is controlled by a control unit, and wherein the conventional direct steering system is omitted and replaced by individual control of the rotational frequency for each wheel in response to a steering-angle sensor. In order to perform a steering operation, the control unit calculates the correct frequency of rotation for each wheel with respect to the drive wheel angle, the velocity and the time point for changing the angle of the drive wheel. Hence, the steering operations for the vehicle are based on advanced algorithms, and the steering system can be characterized as being indirect as it does not comprise any means for direct actuation of steering operations. However, in order for this system to work, the ground must be essentially flat and where no skidding occurs, whereby such a system is practically useless in many situations where the ground is non-flat, e.g. for forest vehicles, which by definition operates in rough terrain where wheels regularly skids.

SHORT DESCRIPTION OF THE INVENTION

The object of the present invention is to solve the problems with vehicles according to the preamble of claim 1. According the invention this object is achieved by the device according to claim 1.

An advantage with the present invention is that it in a very simple and robust way provides a vehicle with constant multi wheel drive without advanced control systems, which system works in terrain.

Another advantage is that the design of the vehicle is simple and robust as the transmission of power from the engine is performed by electrical conductors instead of mechanical shaft arrangements. This is especially advantageous when the vehicle has more than two drive axles. Furthermore the design with many identical motor arrangements reduces the manufacturing costs.

Still another advantage is that the drive arrangement according to the invention makes it possible to considerably lower the weight of the vehicle.

Still another advantage is that the vehicle has considerably lower fuel consumption as compared to conventional vehicles which in turn gives right to reduced emission levels.

Advantageous embodiments of the invention are provided in the dependent claims.

SHORT DESCRIPTION OF THE FIGURES

FIGS. 1*a*, 1*b*, 1*c* and 1*d* schematically show different types of axle arrangements according to the present invention.

FIGS. 2*a* to 2*c* show three embodiments of the present invention in more detail.

Figure 5A:
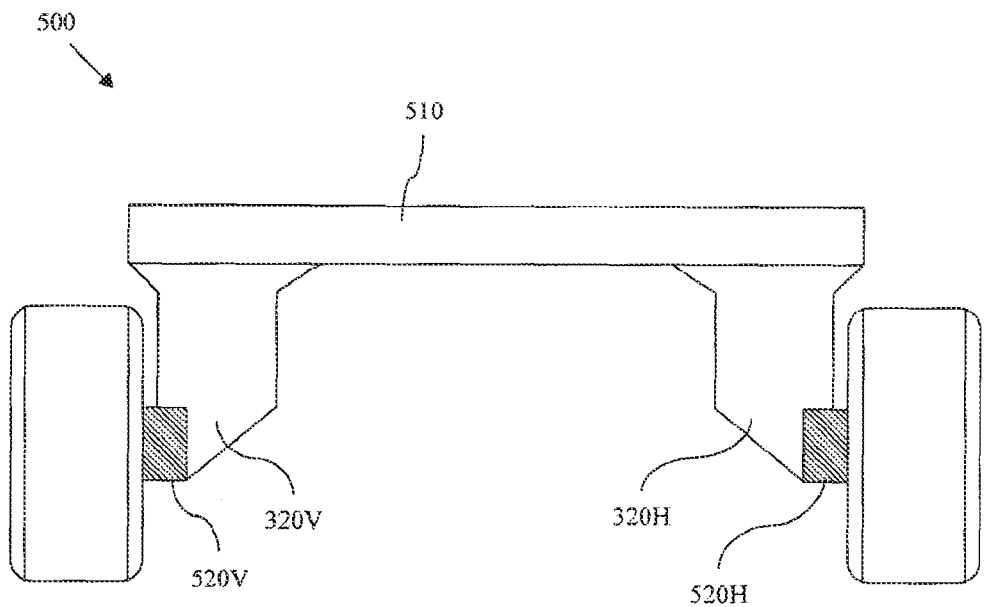
Figure 5B:
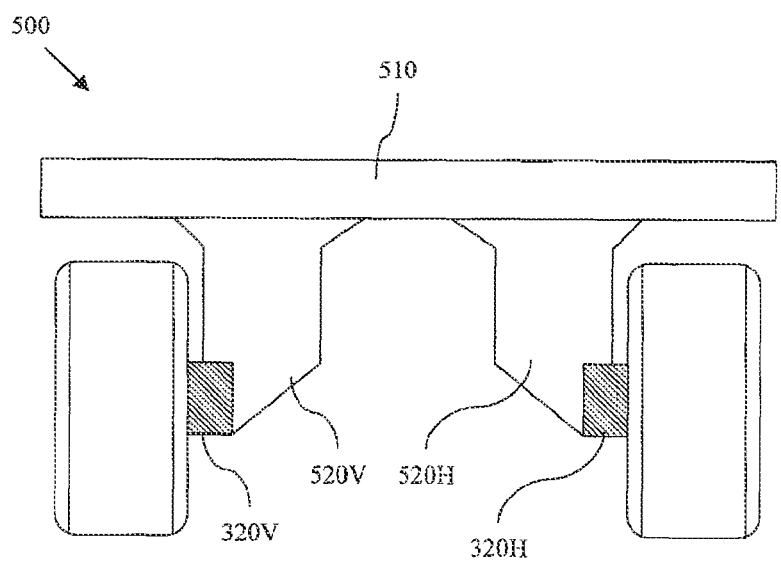

FIGS. 5*a* and 5*b* show still another embodiment of a drive axle according to the present invention.

Figure 6:
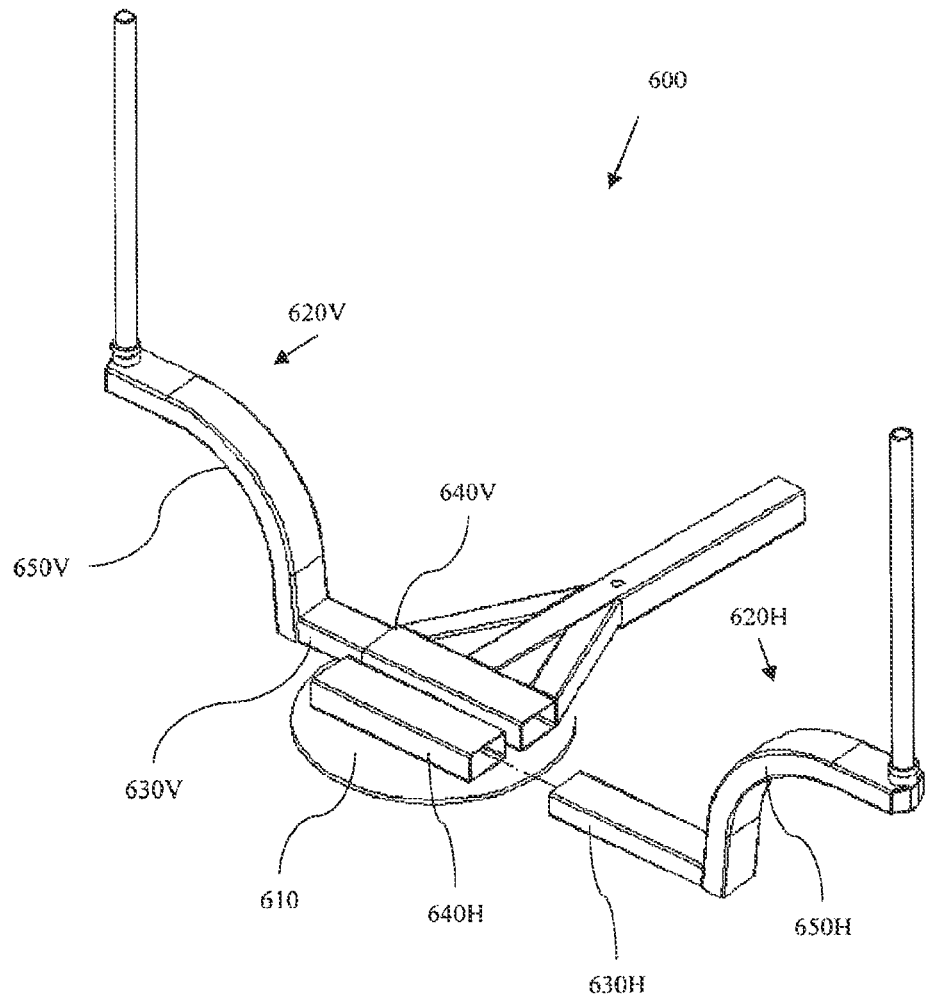

FIG. 6 shows an embodiment of a load carrying structure according to the present invention.

DETAILED DESCRIPTION OF THE INVENTION

Throughout the following description the phrase "side of the vehicle" is used with respect to the normal drive direction for the vehicle, and the same holds for the expressions left and right side, respectively. Moreover, for all embodiments, the present vehicle comprises a steering system that directly controls the steering angle between at least two of the drive axles of the vehicle, such as a conventional hydraulically or electrically powered power steering system.

The present invention is based on the understanding that, for a vehicle so arranged that the wheels on the right and left side, respectively, essentially follow the same wheel tracks during driving, the differential compensation for two consecutive drive axles can be obtained by a direct coupled control system with the steering angle between said drive axles as input. In the ideal case, during a turning operation all wheels on respective sides of such a vehicle travels along the same circle section with the same speed and if the wheels are at the same radius then they also have the same frequency of rotation. Throughout the following description it is assumed that all wheels are of the same radius. The expression direct coupled control system refers to a system that only uses the present steering angle to control the relative frequency of the wheels on the right and left side, respectively.

Figure 1A:
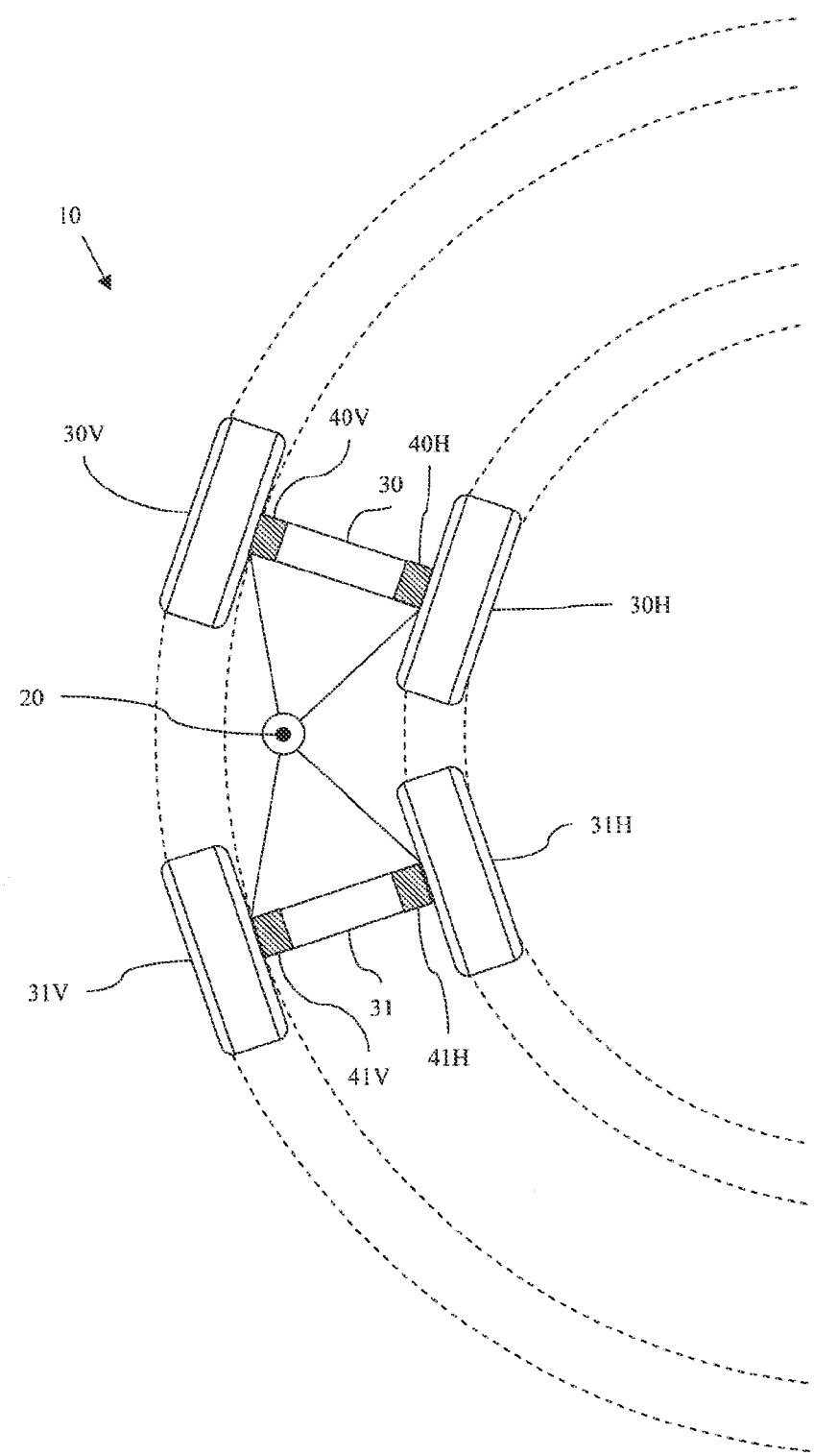
Figure 1B:
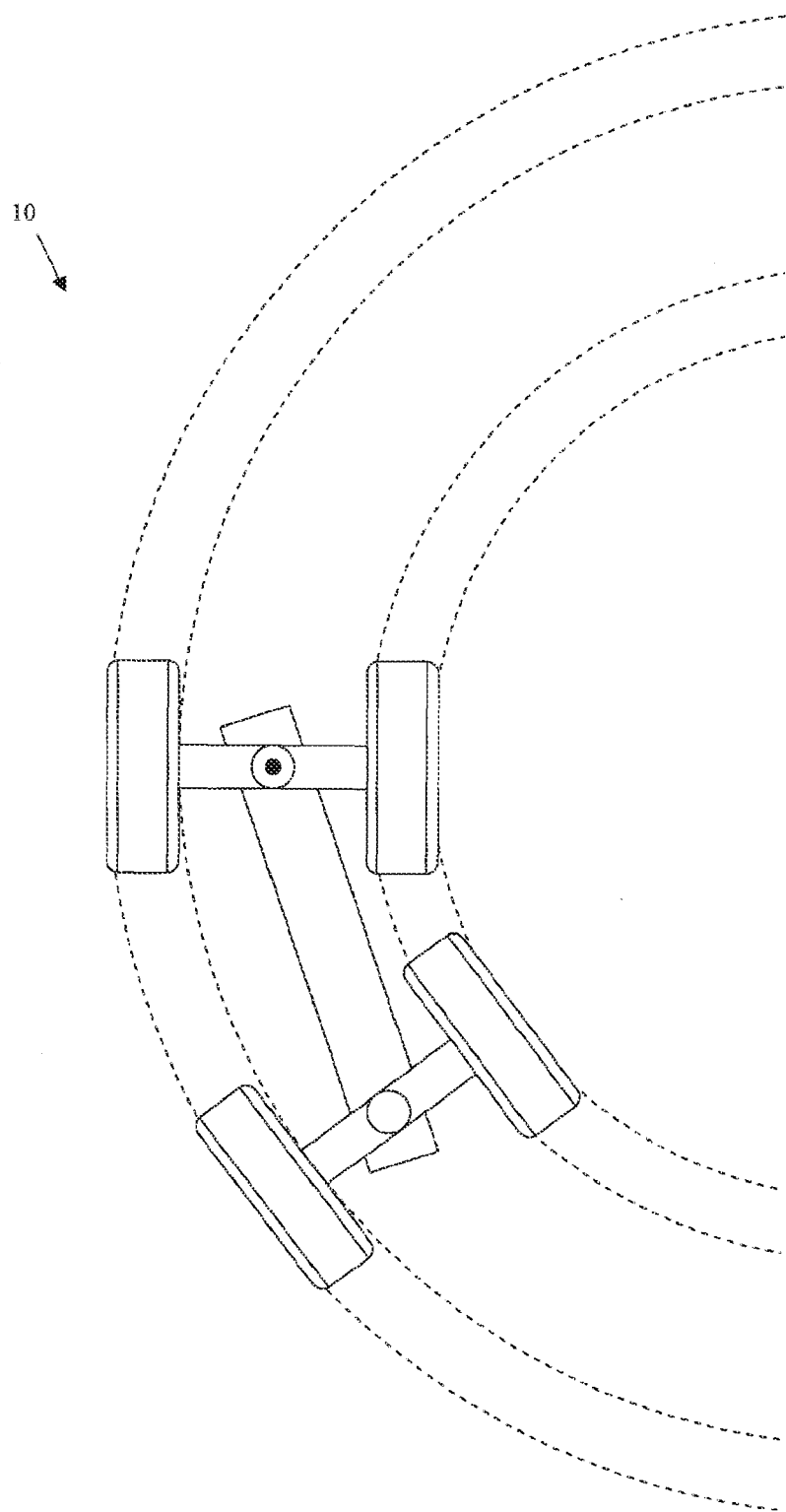

The simplest example of a vehicle of the present type is a symmetric articulated vehicle, which is schematically shown in FIG. 1a. Such a vehicle has a symmetrically positioned turning axis, about which the wheel axles of both pair of wheels turn. FIG. 1b shows an alternative form of symmetrical articulated steering that comprises two separate turning axes, but where the turning action around the respective axles is linked by a linking arrangement (not shown) in order to provide symmetry. Examples of symmetry compensating arrangements are shown in SE 500 259. Such arrangements are especially suitable for vehicles with more than two pairs of wheels such as forest machines with three or more pairs of wheels.

As mentioned above and shown schematically in FIG. 1a, a two axle vehicle 10 according to the present invention comprises a differential compensating means 20 arranged to register the present steering angle for the vehicle 10 and two drive axles 30, 31 with drive wheels 30H, 30V, 31H, 31V and associated drive arrangements 40H, 40V, 41H, 41V. Obviously the vehicle further comprises regulating means both for direction and speed (not shown). The output from the speed regulating means controls together with the differential compensating means 20 the relative frequency of rotation for the drive wheels 40H, 40V, 41H, 41V.

Figure 2A:
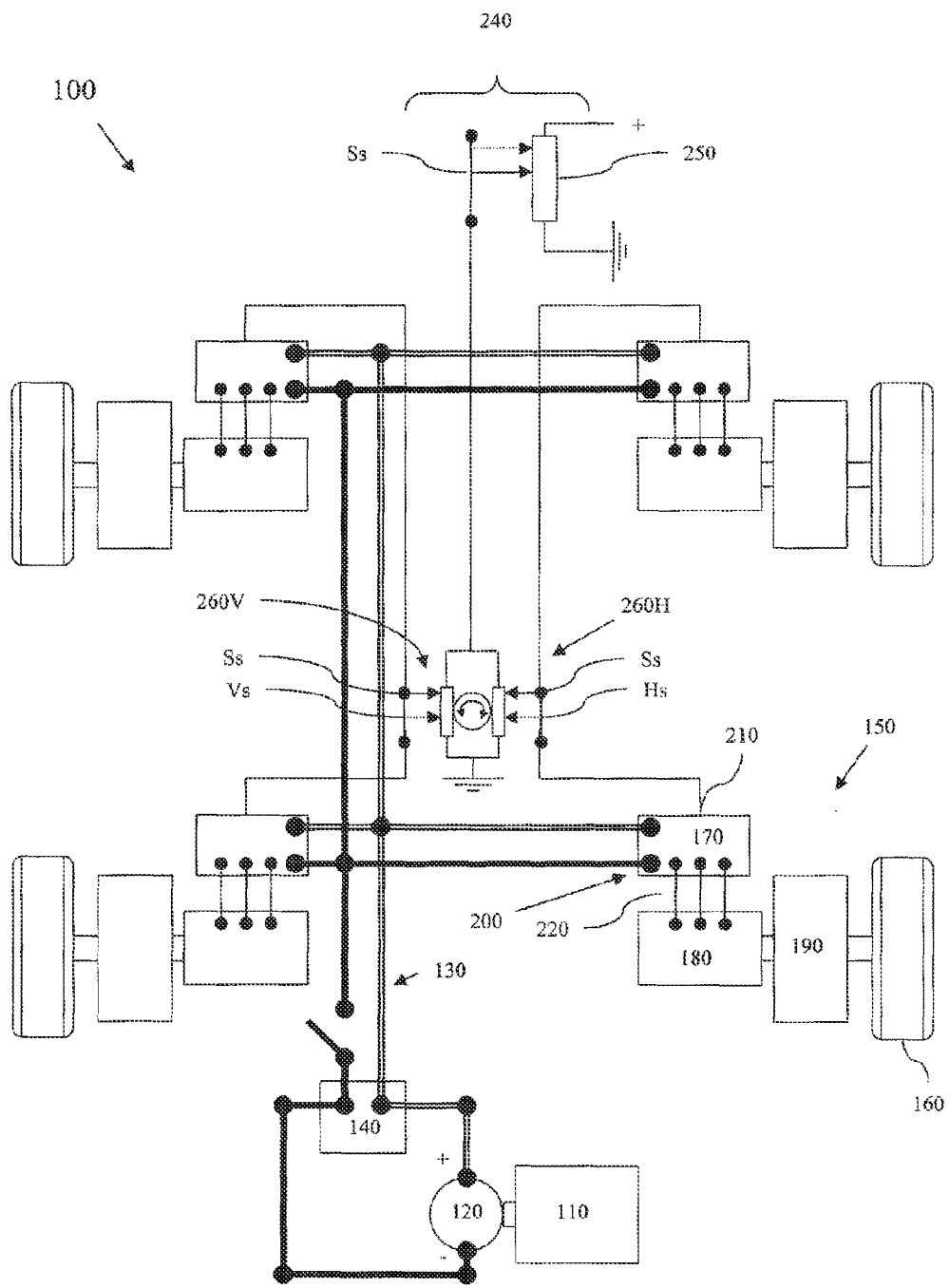

Preferably, the differential compensating means 20 is arranged to register the steering angle directly at the turning axis of the vehicle 10, but can also be arranged to register the angle of the steering means of the vehicle (e.g. steering wheel) or at any suitable position there between. The differential compensating means 20 may be arranged to generate/modify an analogue steering angle signal as shown in the embodiment of FIG. 2a which is described in detail below, or it may generate a digital steering angle signal. The differential compensating means 20 can be formed of a passive electronic component such as one or more rotatable resistor, linear slide rheostat, digital angle/position sensor, or the like, or it may be formed as a control unit with active components enabling adjustments and calibrations. The differential compensating means may further be formed of a control unit with a processing unit, in order to provide more advanced control possibilities in certain situations, such as when a turning operation is performed while the vehicle is at rest.

In one embodiment, the differential compensating means 20 is comprised of two separate components, one for right hand turn and one for left hand turn, which are activated when turning in the respective direction. By this arrangement the differential compensating means 20 does not affect the frequency of rotation for the outer wheel at a turning operation, at the same time as the frequency of rotation for the wheels on the inner side is lowered. This embodiment can be generalized in the following way:

the rotational speed for all drive wheels on the right side is controlled by a right hand side speed signal and that the rotational speed for all drive wheels on the left side is controlled by a left hand side speed signal, the speed regulating means generates a global speed signal that is fed to the differential compensating means, the steering angle sensor is arranged to register the present steering angle for the vehicle and that the differential compensating means is arranged to transform the global speed signal to differential-compensated speed signals for right and left side, respectively, according to the following criteria:

when the steering angle, registered by the steering angle sensor, is zero and the vehicle travels straight forward, then both the right and left hand side speed signals are equal to the global speed signal, when the steering angle, registered by the steering angle sensor, indicates that the vehicle performs a right hand turn, then the left hand side speed signal is equal to the global speed signal, and the right hand side speed signal is differential-compensated in accordance with the registered steering angle, and when the steering angle, registered by the steering angle sensor, indicates that the vehicle performs a left hand turn then the right hand side speed signal is equal to the global speed signal, and the left hand side speed signal is differential-compensated in accordance with the registered steering angle.

The degree by which the differential compensating means 20 influence the relative frequency of rotation is adapted to the constitution of each specific vehicle, with respect to the distance between axles, width of axles, diameter of the wheels, the constitution of the steering and the like. Naturally it is also possible to design the differential compensating means 20 so that constant speed is kept through a turning operation (provided that the speed regulating means is not changed) by raising the frequency of rotation for the outer drive wheels at the same time as the frequency of rotation for the inner drive wheels is lowered.

Preferably the drive arrangements 40H, 40V, 41H, 41V are formed as individual drive arrangements with individual controllable frequency of rotation, where both drive arrangements arranged on the same side of the vehicle in FIG. 1a are controlled by the same steering angle signal from the differential compensating means 20. The result of this solution is that the relative frequency of rotation for both wheels on each side of the direction of travel of the vehicle is controlled according to the steering angle signal from the steering angle sensor. Each and one of these drive arrangements 40H, 40V, 41H, 41V preferably comprises an electrical drive motor, but it is also possible to imagine alternative embodiments with hydraulic driving or the like. One preferred embodiment of such a drive arrangement comprises an AC motor, of which the frequency of rotation is controlled by the frequency of the AC current. In an embodiment of this kind each drive arrangement 40H, 40V, 41H, 41V preferably also comprises a voltage converter with the capacity to provide AC current with a controllable frequency. Alternatively, one single voltage converter can be connected to two or more drive arrangements on the same side. In a similar way all drive arrangements on each side (right or left) can be mechanically connected and driven by one common motor. According to another alternative embodiment each pair of drive wheels can be driven by one single motor arrangement with a gear box with a controllable relationship between the relative frequency of rotations for left and right side respectively.

In one preferred embodiment the drive arrangements 40H, 40V, 41H, 41V comprise an electrical drive motor provided with electric energy from a current source on the vehicle. This current source can be a battery arrangement or a current generating arrangement such as a generator connected to an internal combustion engine or a fuel cell.

According to one embodiment the outputs from the speed regulating organ and the differential compensating means 20 for a right hand and a left hand signal, respectively, are combined and fed to the drive arrangements on right hand 40H, 41H and left hand side 40V, 41V, respectively, whose frequency of rotation is adjusted in accordance with the respective signal. Alternatively the drive arrangements 40H, 40V, 41H, 41V can be provided with separate inputs for speed and steering angle signals, respectively, whereby the general speed is decided by the speed signal and the steering angle signal is interpreted as a deviation from the general speed. This embodiment is especially suitable when the signals are digital signals and each drive arrangement 40H, 40V, 41H, 41V comprises a voltage converter that controls the frequency of rotation for the arrangements.

Figure 1C:
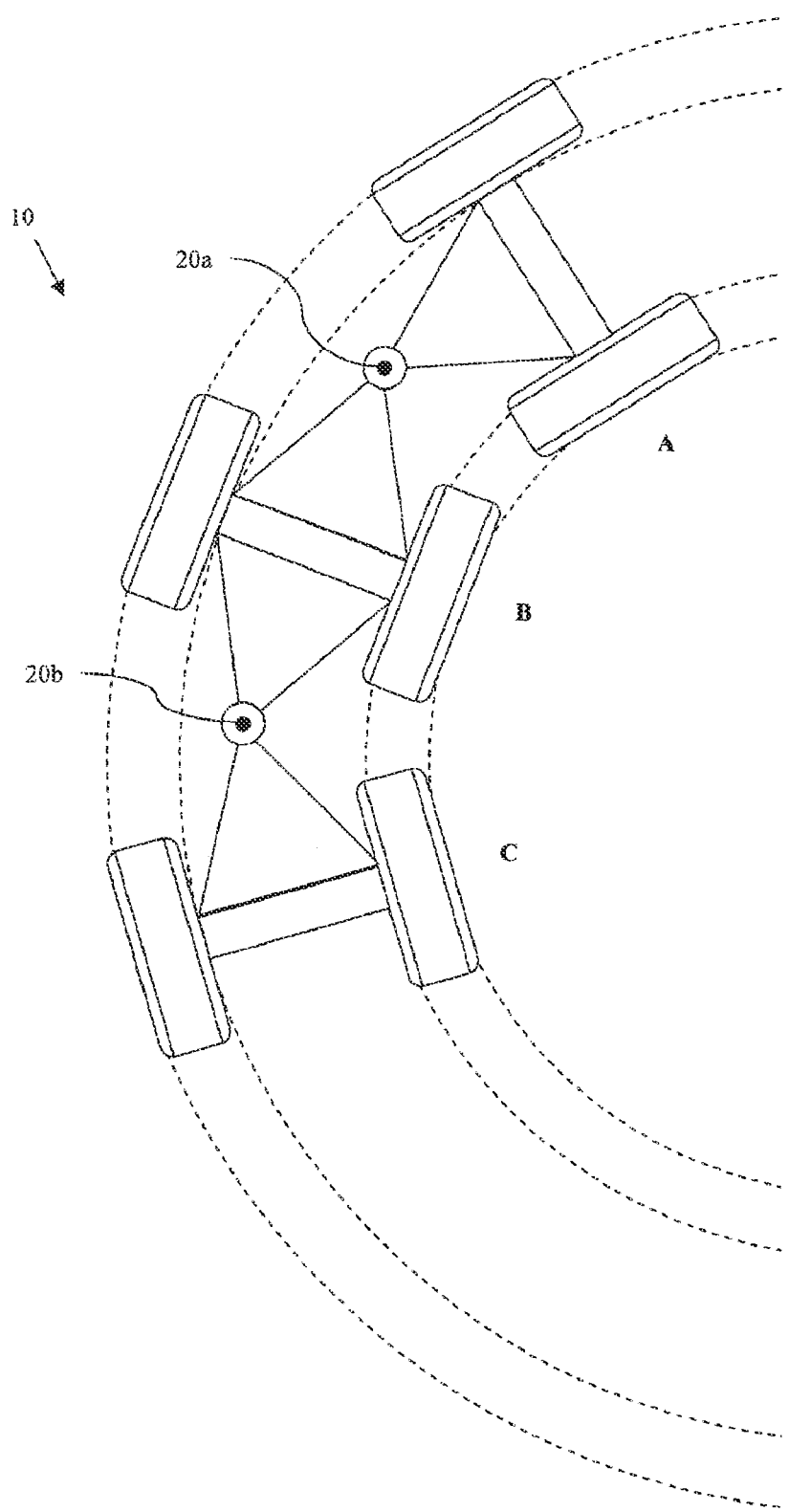
Figure 1D:
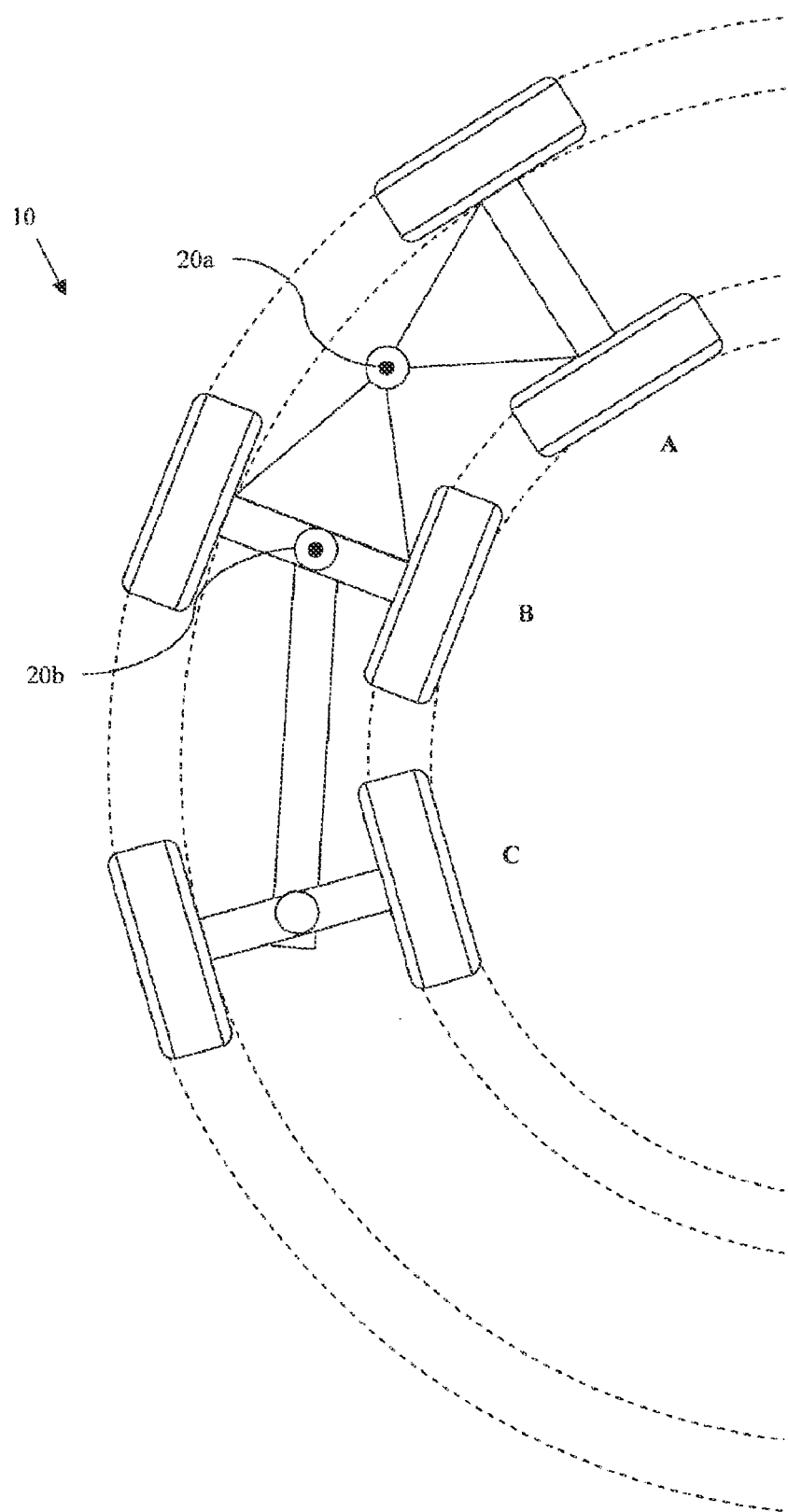

FIGS. 1c and 1d show two schematic examples of a vehicle with three drive axles A, B and C. In FIG. 1c the third drive axle C is coupled to the second drive axle B via an articulated link, whereas the third drive axle C in FIG. 1d is coupled to the second drive axle B by a symmetry compensating link arrangement as shown in FIG. 1b. In order to achieve proper differential compensation for vehicles with more than two drive axles, one additional differential compensating means 20b has to be provided for each additional drive axle. That is: three drive axles require two differential compensating means 20a and 20b, four drive axles: three differential compensating means 20 . . . , etc. Hence there is one differential compensating means 20 for every consecutive pair of drive axles (A-B, B-C, C-D . . . ). Of this plurality of differential compensating means 20, the foremost one 20a controls the differential compensation for the two foremost drive axles A and B, and the other ones 20b the differential compensation for respective drive axle C.

For forest vehicles of forwarder type, the design shown in FIG. 1d is preferred, as there is a straight axle connecting the drive axles, which permits loading of logs between the wheels of the drive axles. Use of this type of symmetry compensating link arrangements for forwarding trailers is thoroughly discussed in SE 500 259.

According to one embodiment of the present invention, a multi drive axle vehicle according to the present invention is provided with a reverse direction steering system arranged to control the steering angle between the rearmost two drive axles during driving operations in the reverse direction. In this embodiment, the main steering system is made passive during reverse driving and consequently the reverse direction steering system is made passive during forward driving. In order to achieve correct differential compensation for reverse driving, the rearmost differential compensating means 20b is made to control the two rearmost drive axles B and C, and the other ones respective drive axle in the same manner as above. The multi drive axle vehicle according to the present invention, thus exhibits more or less identical performance in forward and reverse driving.

FIG. 2a shows a more detailed example of a power train 100 for a vehicle according to the present invention as shown in FIG. 1a. The power train 100 is a so called hybrid type power train and comprises an internal combustion diesel engine 110 that drives a generator 120. The generator 120 is an AC current generator that via a rectifier provides a main supply 130 of DC current. The main supply 130 is represented by two heavy duty conductors (flexible) that are connected to, and hence supplies DC current to, the individual drive arrangements 150 at each drive wheel 160 through branched conductors. A battery 140 is connected to the main supply 130 in order to store surplus energy and to supply additional energy at load situations that require more energy than the generator 120 provides.

The individual drive arrangements 150 at each drive wheel 160 are all essentially identical and each comprises a controllable voltage converter 170, an electrical motor 180 and a gear box 190. The controllable voltage converter 170 has a supply input 200 for DC current connected to the main supply 130 according to the above, a control signal input 210 connected to a control system 240 and an AC current output 220 connected to the electric motor 180. The voltage converter 170 is arranged to convert DC current from the main supply 130 to an AC current with a frequency controlled by a control signal Vs, Hs received through the control signal input 210. Such controllable voltage converters 170 are well known in the field and do not require more detailed description. The AC current output is of three phase type, and hence the motor 180 is a three phase motor rotating with a frequency of rotation controlled by the frequency of the AC current. One advantage with this arrangement is that the motor 180 rotates with an essentially constant frequency of rotation irrespective of the load (higher load requires higher current).

The motor 180 is in turn connected to each drive wheel via a mechanical gear box arrangement 190 that transforms the frequency of rotation from the motor 180 in a suitable manner so that the vehicle can be driven at speeds within a suitable interval.

The control system 240 of power train 100 is as discussed earlier of a very simple design, as compared to known systems. In the present embodiment the control system 240 comprises a general speed regulating means 250 in the form of a voltage divider with a DC voltage of e.g. 12 volts is provided to the input and that gives an output signal Ss between 0-12 volts depending on the position of the means. Moreover, the control system 240 comprises a differential compensating means 20 in the form of steering angle sensors 260h, 260v for the right hand side and the left hand side, respectively, of the vehicle. These steering angle sensors 260h, 260v also work as voltage dividers whereby their input is fed with the output signal Ss from the speed regulating means. Output signals, Hs, Vs from the steering angle sensors 260H and 260V are provided to the steering angle input 210 of all motor arrangements 250 on each side. The steering angle sensors 260H, 260V are connected to the steering of the vehicle in such a way that the output signal Ss from the speed regulating means 250 passes unaffected to the steering angle sensors 260H, 260V, (Vs=Ss=Hs) when the direction of travel for the vehicle is straight, and when the vehicle performs a turning operation they lower the control voltage Vs or Hs for that side of the vehicle which it is turning, while the control voltage Vs or Hs for the other side is preserved unchanged (Vs=Ss>Hs for a right hand turn and Vs<Ss=Hs for a left hand turn).

The input signals Hs, Vs to the voltage converter 170 are thus analogue signals with a voltage between 0 and 12 volts and the corresponding outputs to the electric motors 180 are controlled so that the frequency of rotation is controlled from 0 to the maximum speed of rotation in that the frequency of output drive current varies from 0 to the maximum frequency. By this arrangement the outer wheels will, at constant Ss, keep the same speed through all turning operations. In order for this to work satisfactory, the two steering angle sensors 260h, 260v are calibrated so that, the lowering of the frequency of rotation generated by the output signals Vs, Hs, corresponds to the shortened distance of travel for the wheels.

Figure 2B:
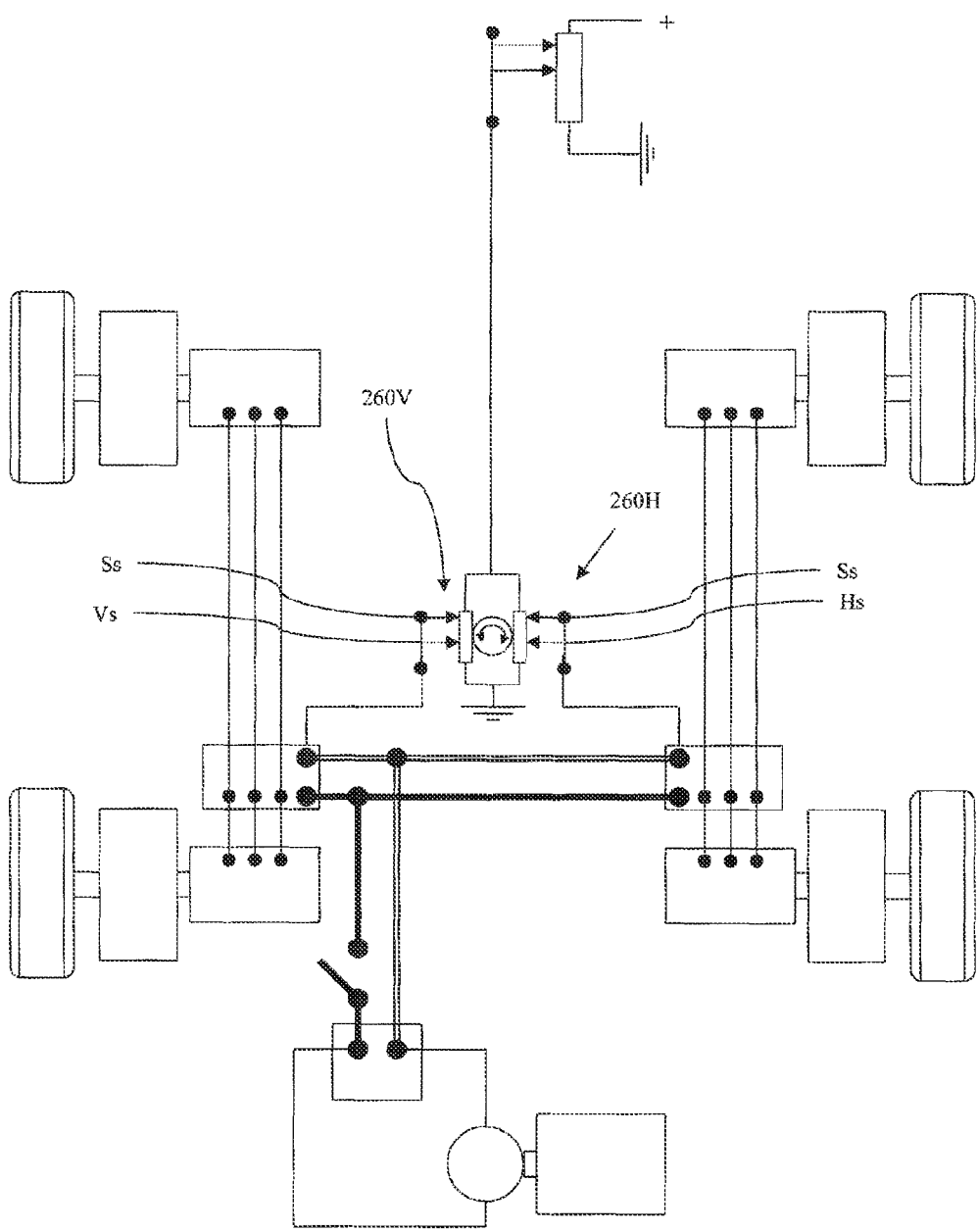

FIG. 2b shows an alternative embodiment of the power train 100, where all electrical motors 180 on each side H, V are connected to one single voltage converter 170, this embodiment uses less voltage converters 170, but on the other hand it requires more conductors. It is also possible to imagine combinations of these two embodiments, wherein drive axles arranged close to each other utilize common voltage converters 170.

Figure 2C:
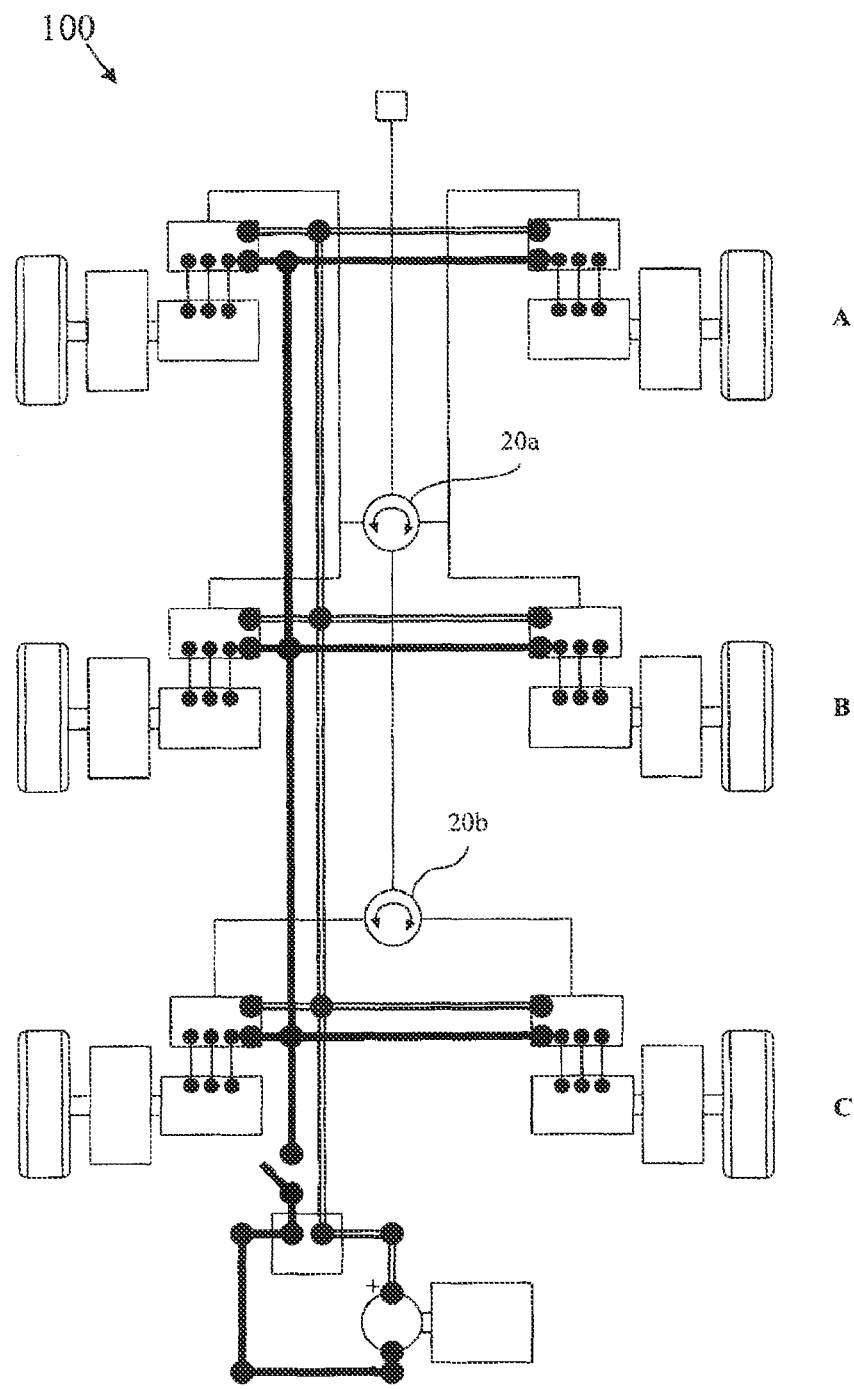

FIG. 2c shows an embodiment of a power train for a vehicle with three drive axles A, B and C as is shown in FIG. 1c. As discussed above a second differential compensating means 20b has been arranged to register the steering angle between the second B and third C drive axle and to compensate the frequency of rotation for the drive wheels of the third C drive axle in accordance with the registered steering angle. As discussed above, this arrangement can be extended in order to provide a multi drive axle vehicle with essentially any number of drive axles.

As mentioned above, the constitution of vehicles according to the present invention is limited to vehicles that in a normal drive situation are arranged such that all drive wheels on its right hand side and left hand side, respectively, essentially follow the same wheel tracks. However there are a number of situations, where this criteria is not fulfilled, such as steering operations when the vehicle is at rest, fast change of steering angle at low speed, and driving in uneven terrain where drive wheels has to travel over obstacles and down through holes or the like. To some extent it is possible to compensate for such deviations, by use of additional sensors and/or a more advanced control system. However, in the embodiment using frequency controlled electric motors 180 provides more or less automatic compensation of these deviations in that the motor is allowed/able to slip both in the forward and the rearward directions. Moreover, for forest vehicles of multi drive axle type limited skidding of individual wheels is practically unavoidable due to the terrain, and some skidding can therefore be accepted in order to achieve better over all constant multi wheel drive as the present invention provides.

Figure 3:
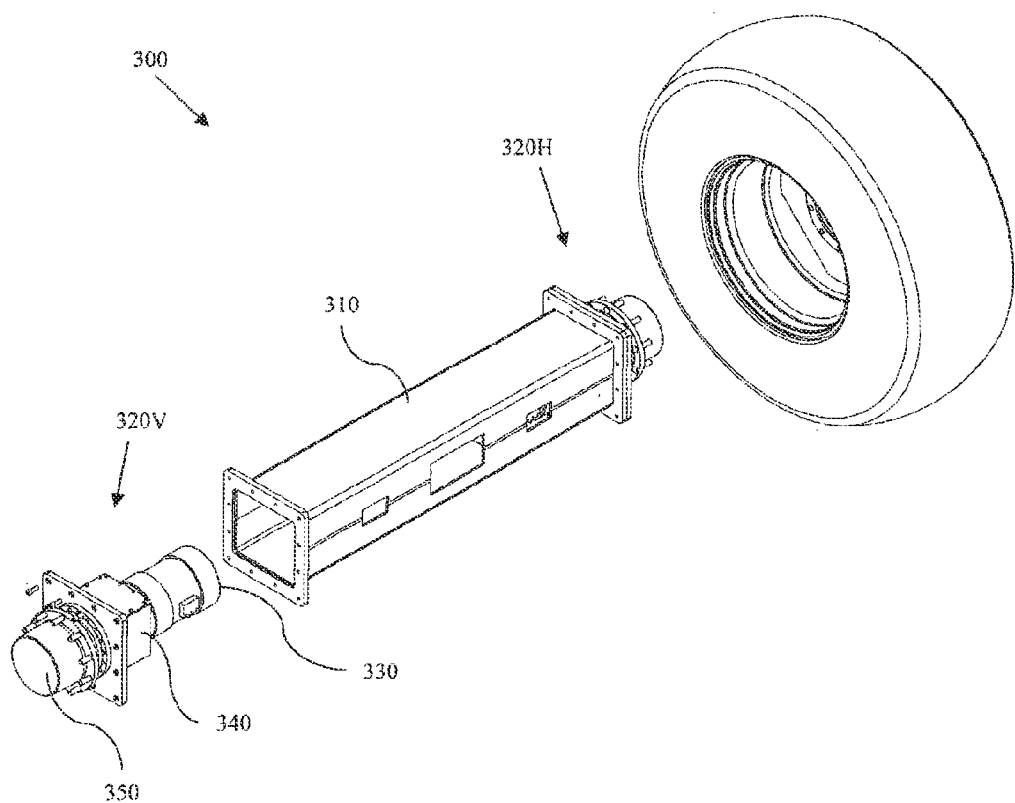
FIG. 3 shows an embodiment of a drive axle according to the present invention.

In one embodiment, one or more drive axles can be deactivated during driving (involving turning operations) on high friction surfaces, such as pavement roads or the like, in order to eliminate the influence of any deviations from the criteria for the differential compensation FIG. 3 shows an exploded view of a drive axle 300 intended to be used in a vehicle according to the present invention. By providing a standardized drive axle, a simple and robust vehicle can be designed. Further, such a vehicle is easy to repair because the number of spare parts needed for repairing the vehicle is minimized. The drive axle 300 comprises an axle beam 310 with a drive arrangement 320H and 320V, respectively, detachably arranged at each end. Both drive arrangements 320H, V are structurally identical and comprise an electrical motor 330, a gear arrangement with wheel bearings 340 and a hub 350. Alternatively each drive arrangement 320, 350 may also comprise a voltage converter, in that case connected to the electric main supply and control system of the vehicle. Thereafter, the drive axle 300 is arranged in a suitable way on a vehicle and the motors 330 are electrically connected to a controllable electrical supply system in the vehicle. As mentioned above, this structure implies very simplified maintenance procedures, because the whole drive axle 300 or individual drive arrangement 320H, V can easily be exchanged if something has failed. Moreover, it will be both simpler to design and to manufacture vehicles based on drive axles of this type.

Figure 4:
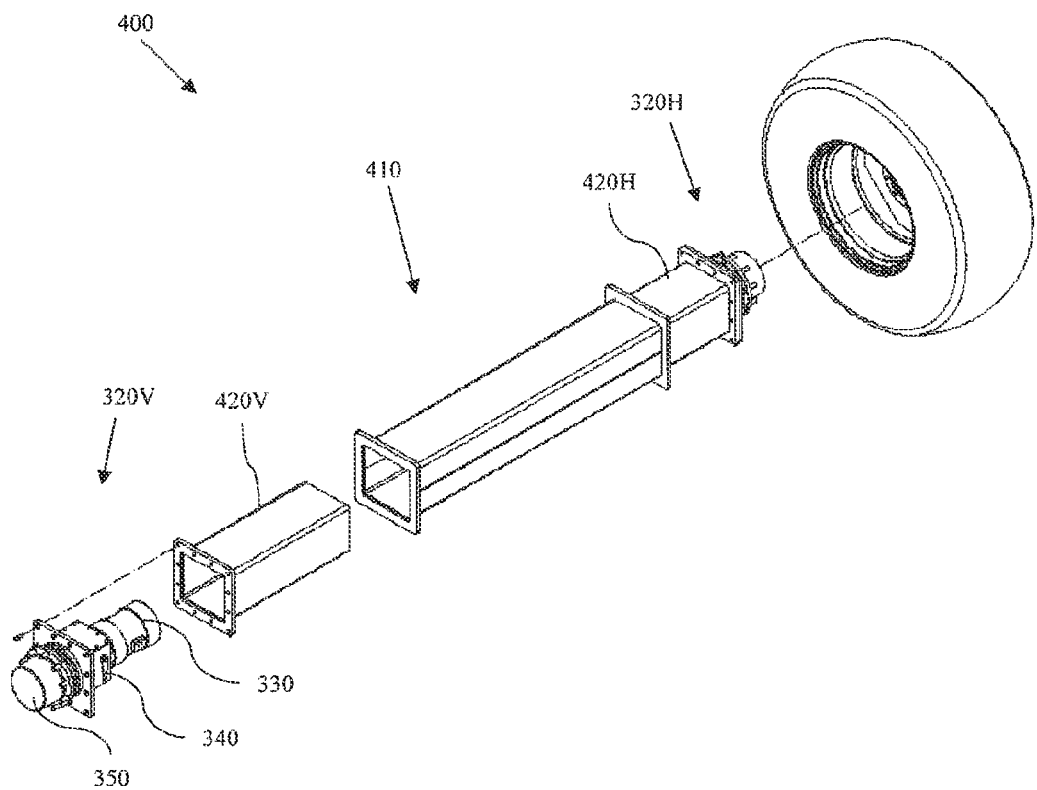
FIG. 4 shows another embodiment of a drive axle according to the present invention.

FIG. 4 shows an embodiment of an extendable drive axle 400 according to the present invention. In this embodiment, the axle beam 410 is of telescopic design, enabling variable track width. The axle beam 410 is comprised of a central section that is attached to the vehicle frame and a right and a left side telescopic mounting means, 420H, V, respectively. Drive arrangements 320H, V are arranged at the outer ends of the telescopic mounting means 420H, V respectively, as disclosed in the above embodiment. The drive arrangements 320H, V are connected to the main supply 130 and the control system 240 by flexible cables or sliding contacts or the like (not shown), in order to transfer electric power and control signals to the drive arrangements 320H, V. Extension and retraction of the extendable axle may be actuated by a hydraulically or electrically powered actuator arrangement (not shown), controlled by the vehicle driver. The telescopic mounting means 420H, V may either be actuated symmetrically by a common actuator arrangement or individually by separate actuator arrangements, whereby one side of the axle may be extended or retracted independent of the other side.

FIGS. 5a and 5b schematically show an alternative embodiment of an extendable drive axle 500, comprising an axle beam 510 and drive arrangements 320H, V moveably attached to the axle beam 510 by mounting means 520H, V. The mounting means 520H, V are attached to the axle beam 510 by a suitable mating structure that allows the mounting means 520H, V to slidingly move along the beam 510. This embodiment provides increased ground clearance, at the expense of higher centre of mass for the load on the axle; therefore, this embodiment is preferably used with wheels of smaller radius, compared to the embodiment shown in FIG. 4, wherein some of the load can be carried in between the wheels (as discussed below with reference to FIG. 6).

The configuration with individual drive arrangements 320H, V, 520H, V for each drive wheel of a drive axle makes the extendable design simple and robust, as there are no mechanical elements needed for transmitting drive power from the main power supply 130 to the drive wheels. Some or all axles of a multi axle vehicle may be extendable, and the extendable axles may be controlled individually, or in group.

The extendable drive axle according to the present invention facilitates construction of heavy vehicles, such as forest vehicles with adjustable track-width. Adjustable track-width makes it possible to use the same vehicle for a greater number of tasks in forestry. With the extendable axles in the retracted position, the vehicle can pass through more narrow passages, which results in a vehicle with high accessibility, which is of great importance in many situations, e.g. in difficult terrain with many obstacles, and. With the extendable axles in the extended position, the vehicle is more stable and can thus carry a larger load with a lower risk of overturning, e.g. a forwarder can transport a large volume of wood from a cutting area, and the cutting range for a harvester can be extended. Hence, the extendable axles make it possible to use the same vehicle both for thinning and final cutting with high capacity.

FIG. 6 shows an example of an extendable load carrying structure 600 for a forwarder with extendable drive axles 400 of the type shown in FIG. 4. The extendable load carrying structure 600 comprises a base 610 that is attached to the frame of a forest vehicle, and two extendable retaining means 620H, V. The extendable load retaining means 620H, V comprises a horizontal section 630H, V that fits into a mating structure 640H, V on the base 610. Moreover, the extendable retaining means 620H, V comprises a section 650H, V that is shaped to provide clearance for the wheel of the drive axle(s). Extension and retraction of the extendable retaining means 620H, V can be both independently actuated by suitable actuator means or coupled to the extension and retraction of the extendable drive axles 400.

The power train according to the present invention has been described as a part of a vehicle provided with wheels, but it may also be used to control the differential distribution for a vehicle with tracks or a vehicle with both wheels and tracks, such as a tracked vehicle or the like.

During tests it has been shown that a vehicle with electric propulsion according to the present invention exhibits unsurpassed fuel economy as compared to similar vehicles with a conventional power train it has been shown that a forest vehicle with more than two pairs of drive wheels exhibits 50% lower fuel consumption under unloaded conditions. During load conditions the reduction is expected to be even greater, because the drive arrangement according to the present invention also results in that the vehicle can be made lighter. It is estimated that the dead weight for a forwarder can be 50% if it is designed with a power train of this type. Further, the energy consumption for the vehicle can be reduced even more by using so called regenerative motor brake, wherein the braking energy is recycled through the electrical motors that work as generators during motor braking and in that way generates current that can be stored in the battery of the vehicle.

The invention claimed is:

1. A vehicle, comprising:
   at least three drive axles (A, B, C), each axle with a pair of drive wheels (30H, 30V, 31H, 31V),
   drive arrangements (40H, 40V, 41H, 41V) driving the drive wheels, the drive arrangements comprising an electric drive motor,
   a steering system that direct controls the steering angle between at least two of the drive axles,
   wherein the vehicle is arranged such that all drive wheels on the vehicle's right hand side and left hand side, respectively, essentially follow the same wheel tracks when the vehicle is driven, and
   wherein the frequency of rotation is individually controllable for each drive wheel, and
   differential compensating means (20a, 20b) arranged to register the relative steering angle for each consecutive pair of drive axles, respectively, wherein the mutual frequency of rotation for the drive wheels of each drive axle is controlled by the registered relative steering angle associated with said axle.

2. A vehicle according to claim 1, wherein each drive wheel is driven by a separate electric motor arrangement (40H, 40V, 41H, 41V).

3. A vehicle according to claim 1, wherein the vehicle is an articulated vehicle.

4. A vehicle according to claim 1, wherein,
   the first two drive axles are coupled and by a symmetric articulated steering system, and
   the third drive axle and any additional drive axles are coupled to the preceding drive axle by symmetry compensating link arrangements.

5. A vehicle according to claim 1, wherein all wheels are drive wheels.

6. A vehicle according to claim 1, wherein,
   the differential compensating means (20a, 20b) arranged to register the relative steering angle for each consecutive pair of drive axles comprises a steering angle sensor, and the steering angle sensor is an analogue sensor.

7. A vehicle according to claim 1, wherein the steering angle sensor is a digital sensor.

8. A vehicle, comprising:
   at least two drive axles (30,31), each axle with a pair of drive wheels,
   a speed regulating means (240), and
   a steering system that directly controls the steering angle between at least two of the drive axles,
   wherein the vehicle is arranged such that all wheels on the vehicle's right hand side and left hand side, respectively, essentially follow the same wheel tracks when it is driven,
   a differential compensating means (20, 260H, 260V), wherein the rotational speed for all drive wheels on the right side is controlled by a right hand side speed signal and that the rotational speed for all drive wheels on the left side is controlled by a left hand side speed signal,
   wherein the speed regulating means generates a global speed signal that is fed to the differential compensating means,
   wherein the steering angle sensor is arranged to register the present steering angle for the vehicle and that the differential compensating means is arranged to transform the global speed signal to differential-compensated speed signals for right and left side, respectively, according to the following criteria: when the steering angle, registered by the steering angle sensor, is zero and the vehicle travels straight forward, then both the right and left hand side speed signals are equal to the global speed signal, when the steering angle, registered by the steering angle sensor, indicates that the vehicle performs a right hand turn, then the left hand side speed signal is equal to the global speed signal, and the right hand side speed signal is differential-compensated in accordance with the registered steering angle, and when the steering angle, registered by the steering angle sensor, indicates that the vehicle performs a left hand turn, then the right hand side speed signal is equal to the global speed signal, and the left hand side speed signal is differential-compensated in accordance with the registered steering angle.

9. Drive axle (300, 400, 500) for a vehicle (10,100) according to claim 1, comprising an axle beam (310) with an individually controllable drive arrangement (320H and 320V, respectively) detachably arranged at each end.

10. Drive axle (400,500) according to claim 9, wherein the drive arrangements (320H, V) are of identical structure and each comprises an electrical motor (330), a gear arrangement with a wheel bearing (340) and a hub (350).

11. Drive axle (400,500) according to claim 9, wherein the drive arrangements (320H, V) are attached to the axle beam (310) by moveable mounting means (420H, V, 520H, V), that are moveable between an extended state and a retracted state in the width direction of the drive axle.

12. Drive axle (400,500) according to claim 11, wherein the mounting means (420H, V, 520H, V) are telescopic with the axle beam (310).

13. A vehicle according to claim 2, wherein the motor arrangements are electrically driven.

14. Drive axle (400,500) according to claim 10, wherein the drive arrangements (320H, V) are attached to the axle beam (310) by moveable mounting means (420H, V, 520H, V), that are moveable between an extended state and a retracted state in the width direction of the drive axle.

15. The vehicle of claim 8, further comprising: non-drive axles with wheels.

16. The vehicle of claim 1, wherein each of the drive arrangements comprise an electric motor.

17. The vehicle of claim 16, wherein,
   each electric motor is an AC motor with a frequency of rotation controlled by a frequency of an AC current, and
   each drive arrangement (40H, 40V, 41H, 41V) also comprises a voltage converter with a capacity to provide AC current with a controllable frequency.

18. The vehicle of claim 1, wherein,
   each of the drive arrangements comprise an electric motor, and
   each drive motor is an synchronous AC motor with one single voltage converter connected to two or more drive arrangements on the same side.

* * * * *